(12) United States Patent
Kugimiya et al.

(10) Patent No.: US 10,077,193 B2
(45) Date of Patent: Sep. 18, 2018

(54) METHOD FOR PRODUCING SILICA AEROGEL

(71) Applicant: Panasonic Intellectual Property Management Co., Ltd., Osaka (JP)

(72) Inventors: Kazuma Kugimiya, Osaka (JP); Takumasa Yamada, Osaka (JP); Hideyuki Ando, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 64 days.

(21) Appl. No.: 15/311,615

(22) PCT Filed: Mar. 30, 2015

(86) PCT No.: PCT/JP2015/001813
§ 371 (c)(1),
(2) Date: Nov. 16, 2016

(87) PCT Pub. No.: WO2015/177954
PCT Pub. Date: Nov. 26, 2015

(65) Prior Publication Data
US 2017/0081201 A1 Mar. 23, 2017

(30) Foreign Application Priority Data
May 22, 2014 (JP) ................. 2014-106119

(51) Int. Cl.
*C01B 33/158* (2006.01)
*C01B 33/16* (2006.01)
*C01B 33/155* (2006.01)

(52) U.S. Cl.
CPC ........ *C01B 33/1585* (2013.01); *C01B 33/155* (2013.01); *C01B 33/163* (2013.01)

(58) Field of Classification Search
CPC .. C01B 33/1585; C01B 33/155; C01B 33/163
See application file for complete search history.

(56) References Cited

U.S. PATENT DOCUMENTS

| 2004/0059052 A1 | 3/2004 | Biteau et al. |
| 2007/0154379 A1 | 7/2007 | Nakanishi et al. |
| 2009/0104401 A1 | 4/2009 | Nakanishi et al. |

FOREIGN PATENT DOCUMENTS

| CN | 102897779 A | 1/2013 |
| EP | 1 059 267 A1 | 12/2000 |
| JP | 10-182261 A | 7/1998 |
| JP | 5250900 B2 | 4/2013 |
| WO | WO 2005/110919 A1 | 11/2005 |
| WO | WO 2007/010949 A1 | 1/2007 |

OTHER PUBLICATIONS

Extended European Search Report dated Feb. 23, 2017 for corresponding European Application No. 15796189.7.
Lee et al., "Synthesis of silica aerogels from waterglass via new modified ambient drying", Journal of Material Science, Kluwer Academic Publishers, vol. 37, No. 11, Jun. 1, 2002, pp. 2237-2241, XP019209552, ISSN: 1573-4803.
Dorcheh et al., "Silica aerogel; synthesis, properties and characterization", Journal of Materials Processing Technology, Elsevier, NL, vol. 199, No. 1-3, Nov. 1, 2007, pp. 10-26, XP022409626; ISSN: 0924-0136.
International Search Report for corresponding International Application No. PCT/JP2015/001813 dated Jun. 30, 2015.
Form PCT/ISA/237 for corresponding International Application No. PCT/JP2015/001813 dated Jun. 30, 2015.
G. Hayase et al., "Structure and properties of polymethylsilsesquioxane aerogels synthesized with surfactant n-hexadecyltrimethylammonium chloride", Microporous and Mesoporous Materials, Aug. 1, 2012, vol. 158, pp. 247-252.
Shohei Hotta et al., "Kaimen Kasseizai ni yoru Yuki Shushoku Silica Aerogel no Kozo Seigyo", The Ceramic Society for Japan 2010 Nen Nenkai Koen Yokoshu, Mar. 22, 2010, vol. 2010, p. 280 (3D09).

*Primary Examiner* — Anthony J Zimmer
(74) *Attorney, Agent, or Firm* — Renner, Otto, Boisselle & Sklar, LLP

(57) ABSTRACT

A method for producing a silica aerogel includes a gelation step of adding a monoalkyltrialkoxysilane to an acidic aqueous solution containing a surfactant to prepare a sol, and then gelating the sol to prepare a wet gel. The method further includes a separation step of immersing the wet gel in a solvent mixture of a first solvent and a second solvent immiscible with the first solvent. The first solvent has an $E_T^N$ value of 0.5 or less, and the second solvent has an $E_T^N$ value between those of the first solvent and water. The method further includes a drying step of drying the wet gel at a temperature lower than a critical temperature of the first solvent under a pressure lower than a critical pressure of the first solvent to remove the first solvent from the wet gel.

6 Claims, No Drawings

METHOD FOR PRODUCING SILICA AEROGEL

TECHNICAL FIELD

The present invention relates to a method for producing a silica aerogel. In detail, the present invention relates to a method for producing a silica aerogel which is capable of producing the silica aerogel through a simple process at a low cost.

BACKGROUND ART

Silica aerogel owns both of high light transmittance and thermal insulation properties and low refractive index and dielectric properties, which are as low as those of gas, and accordingly, is expected to be fully used for a variety of purposes including a transparent insulator as an example.

As a method for producing the silica aerogel as described above, for example, a method described in Patent Literature 1 is known. Patent Literature 1 discloses a method, in which a nonionic surfactant is dissolved into an acidic aqueous solution, a metal compound having a hydrolyzable functional group is added to a resultant solution, and a product thus obtained is solidified, followed by drying. Then, Patent Literature 1 describes that an inorganic porous body obtained by the method of Patent Literature 1 includes: through holes, which have a pore diameter of 200 nm or more, and continue with one another in a three-dimensional network shape; and pores, which are formed in inner wall surfaces of the through holes, and have a pore diameter ranging from 5 to 100 nm.

Here, alcogel for use in producing the silica aerogel has micropores formed in such a manner that a silicon compound is subjected to polycondensation. However, in general, capillary force applied to the micropores is increased as the pore diameter is smaller and a surface tension of a solvent is large, and accordingly, the alcogel becomes prone to be broken. As a method for avoiding this, there is considered a method of drying the alcogel under a supercritical condition using carbon dioxide. However, such drying under the supercritical condition is a high-pressure process, and accordingly, a large amount of capital investment is required for a special device and the like, and much more labor and time are also required.

Therefore, as a method of drying the alcogel more simply, there is examined a method of imparting, to the alcogel, framework strength exceeding the capillary force or framework flexibility that enables free deformation following the capillary force. Patent Literature 2 discloses a method including: a step of converting sol into gel after preparing the sol by adding a silicon compound such as methyltrimethoxysilane into an acidic aqueous solution containing a surfactant; and a step of drying the sol. Moreover, Patent Literature 2 describes that the gel is dried at a temperature and a pressure, which are those less than a critical point of the solvent for use in drying the gel.

CITATION LIST

Patent Literature

Patent Literature 1: Japanese Unexamined Patent Application Publication No. H10-182261
Patent Literature 2: Japanese Patent No. 5250900

SUMMARY OF INVENTION

When gel which has not had all the surfactant removed is dried, contraction during the drying process will reduce the porosity of the obtained silica aerogel. The surfactant therefore needs to be removed before drying the gel. In Patent Literature 2, the surfactant is removed from the gel by performing solvent exchange for plural times. This process requires a large amount of organic solvent. Especially in Patent Literature 2, the organic solvent to be replaced is fluorine solvent. The solvent exchange has a problem from the viewpoint of an impact on the environment and the cost. Moreover, the complicated process of solvent exchange increases the producing cost.

The present invention has been made in consideration of such a problem as described above, which is inherent in the prior art. Then, it is an object of the present invention to provide a method for producing a silica aerogel which is capable of producing the silica aerogel through a simple process and at a low cost.

To solve the aforementioned problems, a method for producing a silica aerogel according to an aspect of the present invention includes a gelation step of adding a monoalkyltrialkoxysilane to an acidic aqueous solution containing a surfactant to prepare a sol, and then gelating the sol to prepare a wet gel. The method further includes a separation step of immersing the wet gel in a solvent mixture of a first solvent and a second solvent immiscible with the first solvent to move the surfactant contained in the wet gel to a phase of the second solvent while moving the wet gel to a phase of the first solvent. The first solvent has an $E_T^N$ value of 0.5 or less, and the second solvent has an $E_T^N$ value between those of the first solvent and water. The method further includes a drying step of drying the wet gel having moved to the phase of the first solvent in the separation step at a temperature lower than a critical temperature of the first solvent under a pressure lower than a critical pressure of the first solvent to remove the first solvent from the wet gel.

DESCRIPTION OF EMBODIMENTS

A detailed description is made below of a process for producing silica aerogel according to embodiments of the present invention.

First Embodiment

A method for producing a silica aerogel of a first embodiment includes a gelation step of adding a monoalkyltrialkoxysilane to an acidic aqueous solution containing a surfactant to prepare a sol, and then gelating the sol to prepare a wet gel. The method further includes a separation step of immersing the wet gel in a solvent mixture to separate the surfactant contained in the wet gel from the wet gel, and a drying step of drying the separated wet gel.

Gelation Step

In the producing method of the first embodiment, first, a sol is prepared by adding a monoalkyltrialkoxysilane to an acidic aqueous solution containing a surfactant and mixing the same. The monoalkyltrialkoxysilane includes an alkyl group, which is a stable terminal group containing a silicon-carbon bond, and is a silicon compound having chemical properties of alkyl groups. Moreover, hydrolytic reaction of the alkoxy group produces three silanol groups in each molecule, so that the crosslink density of the wet gel is increased in the gelation step. The monoalkyltrialkoxysilane, which includes a chemically stable alkyl group, can reduce contraction of the volume of the gel in the process of drying the wet gel as described later. It is therefore possible to provide a silica aerogel having a small bulk density and a small average pore diameter.

The monoalkyltrialkoxysilane is not particularly limited but needs to include an alkyl group as a stable terminal group. Examples of the monoalkyltrialkoxysilane include methyltrimethoxysilane, methyltriethoxysilane, ethyltrimethoxysilane, ethyltriethoxysilane, vinyltrimethoxysilane, and vinyltriethoxysilane. Examples of the monoalkyltrialkoxysilane further include mono-n-propyltrimethoxysilane, mono-n-propyltriethoxysilane, monohexyltrimethoxysilane, and monohexyltriethoxysilane. These kinds of monoalkyltrialkoxysilanes may be used alone or in combination. The monoalkyltrialkoxysilane is preferably methyltrimethoxysilane from the viewpoint of high compatibility with water and high hydrolytic reaction rate in the process of producing the sol.

In the producing method of the first embodiment, the acidic aqueous solution contains a surfactant. In the first embodiment, after the monoalkyltrialkoxysilane is hydrolyzed, polycondensation forms a three-dimensional network structure of siloxane in the gelation step while maintaining the alkyl group. In this process, the surfactant reduces the difference in chemical affinity of the solvent and growing siloxane polymers in the reaction system to reduce the likelihood of phase separation induced by polymerization. When the likelihood of phase separation is reduced, the pores in the aerogel solidified by sol-gel transition become finer, so that the phase separation can be maintained at a mesoscopic level.

The surfactant can be at least one of nonionic and ionic surfactants. The ionic surfactant can be at least any one of a cationic surfactant, an anionic surfactant, and an amphoteric surfactant. Preferably, the surfactant in the first embodiment is a cationic or anionic surfactant.

The nonionic surfactant includes a hydrophilic portion, such as polyoxyethylene, and a hydrophobic portion composed of an alkyl group, for example. The nonionic surfactant can include polyoxypropylene as the hydrophilic portion. Examples of the surfactant including a hydrophilic portion, such as polyoxyethylene, and a hydrophobic portion composed of an alkyl group are polyoxyethylene nonylphenyl ether, polyoxyethylene octylphenyl ether, and polyoxyethylene alkyl ether. Examples of the surfactant including polyoxypropylene as the hydrophilic portion are polyoxypropylene alkyl ether and a block copolymer of polyoxyethylene and polyoxypropylene.

Examples of the cationic surfactant include cetyltrimethylammonium bromide and cetyltrimethylammonium chloride. Examples of the anionic surfactant include sodium dodecyl sulfonate.

Examples of the amphoteric surfactant include amino acid-based surfactants, betaine-based surfactants, and amine oxide-based surfactants. Examples of the amino acid-based surfactants include acyl glutamic acid. Examples of the betaine-based surfactants include lauryldimethylaminoacetic acid betaine and stearyldimethylaminoacetic acid betaine. Examples of the amine oxide-based surfactants include lauryldimethylamine oxide.

The aforementioned kinds of surfactants can be used alone or in combination. Preferably, the added amount of the surfactant is properly adjusted depending on the kind of the surfactant and the kind and amount of the monoalkyltrialkoxysilane. The added amount of the surfactant is preferably 0.1 to 10.0 g for 10 g of the monoalkyltrialkoxysilane and more preferably 0.5 to 6.0 g.

In the first embodiment, the acidic aqueous solution preferably contains an acid catalyst in order to generate a silanol group by hydrolysis of the alkoxy group in the monoalkyltrialkoxysilane. The acid catalyst is preferably a carbonic acid such as acetic acid, formic acid, propionic acid, oxalic acid, and malonic acid and is most preferably acetic acid. The acidic aqueous solution has an acid concentration preferably ranging from 0.0003 mol/L to 0.05 mol/L and most preferably ranging from 0.0008 mol/L to 0.02 mol/L.

The method of preparing the aforementioned sol is not particularly limited. In an example of the preparation method, water, the surfactant, and the acid catalyst, if necessary, are added to a reaction device equipped with a hermetically sealed container and a hermetically sealed-type agitator, and the monoalkyltrialkoxysilane is then added thereto. The mixture is then stirred sufficiently. The sol of the hydrolyzed monoalkyltrialkoxysilane is thus prepared.

Next, the sol obtained as described above is subjected to gelation to prepare a wet gel. The method of gelation of the sol is not particularly limited. The wet gel can be produced by adding a base to the sol for gelation, for example.

The base for gelation of the sol can be ammonia water, for example, from the viewpoint that ammonia water has high volatility and little remains in the resultant wet gel. Preferably, the ammonia water has a low concentration of 0.01 to 1 mol/L, for example. Addition of such dilute ammonia water to the sol gradually increases the pH of the sol so as to implement substantially uniform gelation.

In another example of the method for gelation of the sol, the wet gel can be produced by adding a compound that can basify the sol through hydrolysis, to the sol for gelation, for example.

The compound that can basify the sol through hydrolysis, which is not particularly limited, can be urea, for example. The compound can be an acid amide such as formamide, N-methylformamide, N,N-dimethylformamide, acetamide, N-methylacetamide, and N,N-dimethylacetamide and hexamethylene tetramine as a nitrogen cyclic compound. Moreover, the method for gelation of the sol can also use compounds having properties that promote gelation through hydrolytic reaction, such as hydrofluoric acid. The compounds that can basify the sol can be used alone or in combination.

The added amount of the compound that can basify the sol is preferably adjusted depending on the kind of the compound. When the compound is urea, the amount of the compound is preferably 0.1 to 20.0 g for 10 g of the monoalkyltrialkoxysilane and is more preferably 0.2 to 15.0 g. Adding an amount of the compound in these ranges produces a sufficient amount of ammonia in the process of hydrolysis, thus implementing efficient gelation.

The sol mixed with the compound may be heated to prompt the hydrolytic reaction of the compound that can basify the sol. The heating temperature needs to be adjusted depending on the kind of the compound. When the compound is urea, the sol is preferably heated at 50 to 200° C. Moreover, it is preferable that the sol preferably has a pH value of 9.0 to 11.0 after heated.

In the gelation step of the first embodiment, the sol is basified by adding a base or adding a compound that can basify the sol through hydrolysis as described above. In this process, it is preferable that the sol is placed under closed conditions to prevent volatilization and decomposition of the substances contained in the sol. This allows dehydration condensation of the monoalkyltrihydroxysilane, facilitating conversion of the sol to the gel including a solvent rich phase and a framework phase, which are separated from each other.

The gel which has lost fluidity due to the sol-gel transition as described above includes minute unreacted portions in the generated network structure. In order to reduce the unreacted portions, it is preferable that the gel is aged at a proper temperature for a proper period of time as needed. The aging of the gel is a reaction to gradually and more finely connect the reticulations in the unreacted portions under thermal vibration and solvent coexistence conditions. The aging is preferably performed by leaving the gel to stand in the same temperature range as that in the sol-gel reaction. In the aging process, preferably, the gel is placed under closed conditions so that the substances in the gel are prevented from volatilizing or decomposing.

The aforementioned aging processing is preferably performed at a heating temperature of 50 to 200° C. for a heating time of two hours or more, for example. The time required for aging depends on the size and the volume of the pores of the wet gel. It is therefore preferable that the processing time is set to not less than the shortest time in which the pore structure stops changing substantially.

Separation Step

As described above, when the wet gel still containing the surfactant is dried, contraction of the wet gel at the drying process could reduce the porosity of the obtained silica aerogel and increase the bulk density. It is therefore necessary to remove the surfactant from the wet gel.

In the first embodiment, the wet gel obtained as described above is immersed in a solvent mixture of a first solvent and a second solvent which is immiscible with the first solvent. The first solvent has a high affinity with the wet gel while the second solvent has a high affinity with the surfactant. Even when the first and second solvents are mixed, the first and second solvents are separated in upper and lower two layers after being left to stand for a while. The wet gel moves to the phase composed of the first solvent, and the surfactant moves to the phase composed of the second solvent. Accordingly, the surfactant can be easily removed from the wet gel without solvent exchange using a large amount of organic solvent unlike the conventional art.

The first solvent is preferably a low-polar solvent having an $E_T^N$ value of 0.5 or less and more preferably a non-polar solvent with an $E_T^N$ value of 0.03 or less. Herein, the $E_T^N$ value is known as a parameter representing the polarity of a solvent. As described above, since the wet gel includes an alkyl group of a low polarity, the first solvent composed of a low-polar solvent has a high affinity with the wet gel, thus facilitating movement of the wet gel to the phase of the first solvent.

The second solvent needs to be a solvent immiscible with the first solvent. The second solvent needs to have an $E_T^N$ value between those of the first solvent and water. The $E_T^N$ value of the second solvent needs to be greater than 0.5 and less than 1.00 since the $E_T^N$ value of water is 1.00. The surfactant normally has a polarity. Using such a polar solvent as the second solvent facilitates movement of the surfactant to the phase of the second solvent. From the viewpoint of further increasing the affinity of the second solvent with the surfactant and facilitating phase separation between the first and second solvents, the $E_T^N$ value of the second solvent is more preferably not less than 0.70 and less than 1.00.

As described above, when the wet gel is put in the mixture of the first solvent as the low-polar solvent and the second solvent as the polar solvent and is left to stand, the wet gel having a low-polar group gradually moves to the phase of the first solvent while the surfactant having a high polarity moves to the phase of the second solvent. The wet gel having moved to the phase of the first solvent therefore does not include the surfactant. The wet gel is extracted together with the first solvent and dried as described later, thus obtaining the silica aerogel.

The mixture, which is obtained in the aforementioned gelation step and contains the wet gel, contains water used as the solvent and the unreacted silicon compound as well as the wet gel and the surfactant. Such water and silicon compound are highly polar and move to the phase of the second solvent when being put into the solvent mixture of the first and second solvents. The separation step of the first embodiment therefore easily removes the surfactant, water as a solvent, and the unreacted silicon compound from the wet gel.

The first solvent can be a hydrocarbon or organosilicon compound solvent. Specifically, the first solvent preferably contains at least one selected from the group consisting of heptane ($E_T^N$ value: about 0.01), hexane ($E_T^N$ value: about 0.009), and hexamethyldisiloxane. More preferably, the first solvent is composed of at least one selected from the group consisting of heptane, hexane, and hexamethyldisiloxane. Among these substances, the first solvent is particularly preferably heptane, which has a high affinity with the wet gel and has an $E_T^N$ value of not greater than 0.03.

The second solvent can be an alcohol solvent. Specifically, the second solvent preferably contains at least any one of methanol ($E_T^N$ value: about 0.762) and isopropyl alcohol ($E_T^N$ value: about 0.546). More preferably, the second solvent is composed of at least any one of methanol and isopropyl alcohol. Among these substances, the second solvent is particularly preferably methanol, which has a high affinity with the surfactant, water, and the unreacted silicon compound.

In the separation step of the first embodiment, to prompt the reaction to extract the wet gel, the solvent mixture may include a third solvent having a solubility parameter between those of the first and second solvents. The third solvent is preferably isopropyl alcohol when the first solvent is heptane and the second solvent is methanol, for example.

The operation of extracting the wet gel is desirably performed at the highest temperature possible in order to accelerate mutual diffusion of the solvents and diffusion of the substances to be extracted. The solvent mixture of the first and second solvents may be therefore heated. The heating temperature is preferably a temperature at which the first and second solvents cannot volatile. Preferably, the heating temperature is set to 50 to 100° C., for example.

Drying Step

The producing method of the first embodiment removes the first solvent from the wet gel extracted in the aforementioned separation step. By drying the wet gel, desired silica aerogel is obtained.

Specifically, the wet gel having moved to the first solvent as described above is dried so that the first solvent is removed from the wet gel. In this process, the wet gel is dried at a temperature lower than the critical temperature of the first solvent contained in the wet gel under a pressure lower than the critical pressure of the first solvent. The wet gel according to the first embodiment has high framework flexibility and can be prevented from contracting and breaking even when the wet gel is dried at a temperature lower than the critical temperature of the solvent under a pressure lower than the critical pressure thereof. The conditions for drying the wet gel vary depending on the type of the first solvent contained in the wet gel. Preferably, the wet gel is dried at 120 to 200° C. under atmospheric pressure, for example.

When the solvent is removed from the wet gel in such a manner, the silica aerogel according to the first embodiment is obtained. The obtained silica aerogel includes through holes continuous in a three-dimensional network manner and a framework which is composed of the monoalkyltrialkoxysilane including an alkyl group and is continuous in a three-dimensional network manner. The through holes continuous in a three-dimensional network manner can have a diameter of 5 nm to 100 nm and more preferably have a diameter of 20 nm to 35 nm. The cross sections of the framework have diameters of 2 nm to 25 nm and more preferably 3 nm to 7 nm.

As described above, the silica aerogel according to the first embodiment is obtained by the following process.

(a) The wet gel is mixed with a solvent mixture of the first and second solvents which have different affinities, that is, different $E_T^N$ values. The third solvent, which has a solubility parameter intermediate between those of the first and second solvents, is added to the solvent mixture to increase the compatibility of the first and second solvents.

(b) The wet gel including a low-polar alkyl group moves from the second solvent as a high-polar solvent to the first solvent as a low-polar solvent, so that the second solvent existing within the wet gel is replaced with the first solvent.

(c) The wet gel including the replaced first solvent as the low-polar solvent is dried under the predetermined conditions.

Typically, when the wet gel is given a hydrophobic group, such as an alkyl group, for hydrophobization, the phenomenon that the solvent in the wet gel is replaced with a low-density solvent occurs. The aforementioned first solvent generally has low density. Using the solvent mixture of the first and second solvents therefore causes the phenomenon that the wet gel including an alkyl group moves to the first solvent having a low density and a low polarity. Moreover, addition of the third solvent increases the compatibility between the first and second solvents to diffuse the same into each other, thus facilitating movement of the wet gel to the first solvent. Since the replaced first solvent has small surface tension, contraction of the wet gel in the drying process can be reduced.

Accordingly, using the first solvent which has an $E_T^N$ value of 0.5 or less and the second solvent which is immiscible with the first solvent and has an $E_T^N$ value between those of the first solvent and water easily causes the phenomenon that the wet gel including an alkyl group moves to the first solvent having a low density and a low polarity. This facilitates replacement to a low-polar solvent in the wet gel, providing a silica aerogel having a small bulk density.

The method for producing a silica aerogel according to the first embodiment includes the gelation step, in which the monoalkyltrialkoxysilane is added to the acidic aqueous solution containing the surfactant to prepare the sol and the sol is gelated into the wet gel. The producing method further includes the separation step, in which the wet gel is immersed in the solvent mixture of the first solvent and the second solvent immiscible with the first solvent to move the surfactant contained in the wet gel to the phase of the second solvent while moving the wet gel to the phase of the first solvent. In this process, the first solvent has an $E_T^N$ value of 0.5 or less, and the second solvent has an $E_T^N$ value between those of the first solvent and water. The producing method further includes the drying step, in which the wet gel having moved to the phase of the first solvent in the separation step is dried at a temperature lower than the critical temperature of the first solvent under a pressure lower than the critical pressure of the first solvent to remove the first solvent from the wet gel.

The producing method of the first embodiment includes the step in which the wet gel synthesized by the method using the surfactant is immersed in the solvent mixture of the first solvent as the low-polar solvent and the second solvent as the polar solvent to remove the surfactant, the first and second solvents being immiscible to each other. This implements removal of the surfactant and replacement to dry solvent simultaneously, shortening the step of solvent exchange and significantly reducing the amount of required solvent. It is therefore possible to lessen the environmental impact and reduce the producing cost.

Moreover, the producing method of the first embodiment does not need a drying process under supercritical conditions, which is required in the conventional producing method, so that the producing process and the equipment are simplified. The producing method of the first embodiment also does not need to use a fluorine solvent as a dry solvent unlike Patent Literature 2, thus reducing the production cost and also reducing the impact on the environment.

The silica aerogel obtained by the producing method of the first embodiment includes an alkyl group in a framework molecule and has therefore both high rigidity and flexibility. The obtained silica aerogel includes pores smaller than the mean free path of air and has a low bulk density. The silica aerogel is therefore excellent in heat insulation performance and can be preferably used as heat insulation materials in the architectural field, home appliances, and industrial facilities. In addition to the heat insulation materials, the silica aerogel can be preferably used as catalyst supports and the like.

Second Embodiment

Next, a description is given of a method for producing a silica aerogel according to a second embodiment in detail. The same portions in the second embodiment as the first embodiment are not described.

The producing method of the first embodiment uses a monoalkyltrialkoxysilane as the raw material of the silica aerogel. The second embodiment uses silicic acid as the raw material of the silica aerogel in addition to the monoalkyltrialkoxysilane. The combination of the monoalkyltrialkoxysilane and the silicic acid as the raw materials further reduces contraction of the volume at the process of drying the wet gel, thus producing a silica aerogel having a small bulk density and a small average pore diameter.

Specifically, the producing method of the second embodiment first adds a monoalkyltrialkoxysilane to an acidic aqueous solution containing silicic acid (acidic silicic acid aqueous solution) and mixes the same to prepare a sol. The monoalkyltrialkoxysilane has an alkyl group as a stable terminal group including a silicon-carbon bond and is a silicon compound having chemical properties of alkyl groups. Hydrolytic reaction of the alkoxy group produces three silanol groups in each molecule, so that the crosslink density of the wet gel is increased in the gelation step.

The acidic silicic acid aqueous solution contains silicic acid having a composition expressed by $nSiO_2 \cdot mH_2O$. The acidic silicic acid aqueous solution contains silicic acid such as orthosilicic acid ($H_4SiO_4$), metasilicic acid (($H_2Si_2O_3)_n$), and disilicic acid ($H_2Si_2O_5$), for example. When the monoalkyltrialkoxysilane is added to the acidic silicic acid aqueous solution, the acidic silicic acid aqueous solution functions as an acid catalyst for hydrolysis of the alkoxy group of the monoalkyltrialkoxysilane. The monoalkyltrialkoxysilane is therefore hydrolyzed to monoalkyltrihydroxysilane and alcohol in the acidic silicic acid aqueous solution.

The resultant monoalkyltrihydroxysilane is dehydrated and condensed with the silicic acid in the gelation step and organically modifies the surface of the silicic acid, which constitutes the core of the wet gel, with an alkyl group. This results in the silica aerogel including pores smaller than the mean free path of air and having a low bulk density even if the wet gel is not dried under supercritical conditions. The monoalkyltrialkoxysilane is not particularly limited if the monoalkyltrialkoxysilane can organically modify the surface of the silicic acid. The monoalkyltrialkoxysilane can be the same as described in the first embodiment.

Here, the monoalkyltrialkoxysilane is added to the acidic silicic acid aqueous solution so that an amount of silicon in the monoalkyltrialkoxysilane becomes 1 mol part or more with respect to 1 mol part of an amount of silicon in the acidic silicic acid aqueous solution. That is to say, in order that silicon in the monoalkyltrialkoxysilane becomes 1 mol or more with respect to 1 mol of silicon in the silicic acid, a mixed amount of these is adjusted. As described above, the monoalkyltrihydroxysilane produced by hydrolysis of the monoalkyltrialkoxysilane organically modifies the surface of the silicic acid with the alkyl group. When the surface of the silicic acid is sufficiently modified with the alkyl group in this process, it is possible to prevent contraction of the wet gel in the drying step and reduce the bulk density of the resultant silica aerogel.

An upper limit of such an additional amount of the monoalkyltrialkoxysilane to the acidic silicic acid aqueous solution is not particularly limited. However, in this embodiment, it is preferable to effectively suppress the shrinkage in the drying step. Therefore, it is preferable to add the monoalkyltrialkoxysilane to the acidic silicic acid aqueous solution so that the amount of silicon in the monoalkyltrialkoxysilane can be 10 mol parts or less with respect to 1 mol part of the amount of silicon in the acidic silicic acid aqueous solution. Moreover, it is preferable to add the monoalkyltrialkoxysilane to the acidic silicic acid aqueous solution so that the amount of silicon in the monoalkyltrialkoxysilane can be 2 to 5 mol parts with respect to 1 mol part of the amount of silicon in the acidic silicic acid aqueous solution.

The acidic silicic acid aqueous solution can be obtained, for example, by processing water glass by using an acidic cation exchange resin or an inorganic acid, and thereby acidifying the water glass. The water glass is a concentrated aqueous solution of sodium silicate ($Na_2O.nSiO_2$, n=2 to 4), and is obtained by dissolving the sodium silicate into water, followed by heating. Then, the water glass is brought into contact with the acidic cation exchange resin, whereby $H^+$ ions are substituted for $Na^+$ ions, and the acidic silicic acid aqueous solution can be obtained. Moreover, also by adding the inorganic acid to the water glass, the acidic silicic acid aqueous solution can be obtained by releasing a weak acid.

The acidic cation exchange resin is not particularly limited; however, a sulfonic acid-type acidic cation exchange resin, which has a sulfonic acid group as an ion exchange group, can be used. As such a specific sulfonic acid-type acidic cation exchange resin, there can be exemplarily illustrated: a polystyrene-based sulfonic acid-type acidic cation exchange resin; a phenol-based sulfonic acid-type acidic cation exchange resin; a fluorine-based sulfonic acid-type acidic cation exchange resin; and the like. Moreover, the inorganic acid is not particularly limited, either; however, for example, hydrochloric acid, nitric acid, phosphoric acid, sulfuric acid, boric acid, hydrofluoric acid and the like can be exemplarily illustrated.

The acidic silicic acid aqueous solution preferably has a pH value of 3.0 or less. In other words, the acidic silicic acid aqueous solution is preferably obtained by adjusting the pH value of the water glass to 3.0 or less using the acidic cation exchange resin or inorganic acid. The acidic aqueous solution, which has a pH value of 3.0 or less, effectively operates as the acid catalyst for hydrolysis of the alkoxy group of the monoalkyltrialkoxysilane.

The concentration of silicic acid in the acidic silicic acid aqueous solution is not particularly limited if the acidic aqueous solution has fluidity enough to be mixed with the monoalkyltrialkoxysilane. The concentration of silicic acid in the acidic silicic acid aqueous solution is 3 to 15% by mass, for example.

Similarly to the first embodiment, the acidic aqueous solution of the second embodiment contains the surfactant. The presence of the surfactant as described above reduces the difference in chemical affinity between the solvent and growing siloxane polymer in the reaction system and reduces the likelihood of phase separation induced by polymerization. By reducing the likelihood of phase separation, the pores in the aerogel solidified by sol-gel transition are made finer, and the phase separation can be maintained at the mesoscopic level. The surfactant can be the same as described in the first embodiment. The usage of the surfactant is also set equal to that of the first embodiment.

The method of preparing the aforementioned sol is not particularly limited. In an example of the preparation method, a predetermined amount of the acidic silicic acid aqueous solution is fed to a reaction device equipped with a hermetically sealed container and a hermetically sealed-type agitator, and the monoalkyltrialkoxysilane and the surfactant are sequentially added to the aqueous solution. The mixture is stirred sufficiently. The order in which the surfactant is added is not particularly limited. The monoalkyltrialkoxysilane may be added after the surfactant is added to the acidic silicic acid aqueous solution, for example. Alternatively, the surfactant may be added after the monoalkyltrialkoxysilane is added to the acidic silicic acid aqueous solution. The surfactant and the monoalkyltrialkoxysilane may be simultaneously added to the acidic silicic acid aqueous solution.

Next, the sol obtained in the aforementioned manner is subjected to gelation to produce a wet gel. The gelation method of the sol is not particularly limited. In a similar manner to the first embodiment, the wet gel is produced by adding a base to the sol for gelation, for example. The wet gel is also produced by adding a compound that can basify the sol through hydrolysis, to the sol for gelation, for example. Similarly to the first embodiment, ammonia water as the base for gelation of the sol and compounds that can basify the sol through hydrolysis can be used, for example. The added amount of a compound that can basify the sol through hydrolysis can be the same as that of the first embodiment.

In the gelation step of the second embodiment, the sol is basified by adding a base or a compound that can basify the sol through hydrolysis as described above. In this process, it is preferable that the sol is placed under closed conditions to prevent volatilization and decomposition of the substances contained in the sol in a similar manner to the first embodiment. The monoalkyltrihydroxysilane is dehydrated and condensed on the surface of the silicic acid, and the surface is more likely to be organically modified with the alkyl group. Moreover, condensation of the organically modified silicic acid and the remaining monoalkyltrihydroxysilane facilitates conversion of the sol to a gel including a solvent-rich phase and a framework phase, which are separated from each other.

Similarly to the first embodiment, it is preferable to age the resultant wet gel. The aging process is preferably performed at a heating temperature of 50 to 200° C. for a heating time of two hours or more, for example, in a similar manner to the first embodiment.

The obtained wet gel is immersed in a solvent mixture of a first solvent and a second solvent immiscible with the first solvent in a similar manner to the separation step of the first embodiment. The wet gel therefore moves to the phase composed of the first solvent while the surfactant moves to the phase composed of the second solvent. The surfactant is therefore easily removed from the wet gel without solvent exchange using a large amount of organic solvent. The conditions for the separation step are the same as those of the first embodiment.

Thereafter, the wet gel extracted in the separation step is dried at a temperature lower than the critical temperature of the first solvent under a pressure lower than the critical pressure of the first solvent to remove the first solvent from the wet gel in a similar manner to the first embodiment. When the wet gel is dried in such a manner, a desired silica aerogel is obtained.

The wet gel according to the second embodiment is synthesized from the monoalkyltrialkoxysilane and the silicic acid sol and includes an alkyl group inside as described above. The wet gel has a framework strength larger than the capillary force or a framework flexibility high enough that the wet gel can freely deform due to the capillary force and can be dried without using a solvent having low surface tension, such as a fluorine solvent. Even when being dried at a temperature lower than the critical temperature of the first solvent under a pressure lower than the critical pressure thereof, contraction and break of the wet gel can be reduced. The conditions for drying the wet gel depend on the kind of the solvent contained in the wet gel. The wet gel is preferably dried at 120 to 200° C. under atmospheric pressure, for example.

When the solvent is removed from the wet gel as described above, the silica aerogel according to the second embodiment is obtained. The obtained silica aerogel is composed of through holes continuous in the three-dimensional network manner and a framework which is composed of silicic acid with the gel wall surface covered with the alkyl group and is continuous in a three-dimensional network manner.

As described above, the framework in the silica aerogel of this embodiment is obtained by the condensation of the silicic acid represented by $nSiO_2 \cdot mH_2O$ and the monoalkyltrihydroxysilane represented by $RSi(OH)_3$ (R: alkyl group). Therefore, the framework of the silica aerogel includes: a tetrafunctional type silicate ($SiO_2$), which is caused by the silicic acid and is called a Q unit: and organosilsesquioxane ($RSiO_{1.5}$), which is caused by the monoalkyltrihydroxysilane and is called a T unit. Then, the framework forms a Q3 structure, in which the silicate is bonded to three atoms of neutral oxygen and one hydroxyl group, and a Q4 structure, in which the silicate is bonded to four atoms of the neutral oxygen, and further, forms T2, in which the organosilsesquioxane is bonded to two atoms of the neutral oxygen and one hydroxyl group, and T3, in which the organosilsesquioxane is bonded to three atoms of the neutral oxygen.

Moreover, as mentioned above, the silica aerogel includes the alkyl group in the framework. Therefore, it becomes possible to form such a framework provided with appropriate strength and flexibility.

The silica aerogel obtained as described above includes a three-dimensional network structure in the mesoscopic range (1 nm to 100 nm). The through holes continuous in a three-dimensional network manner can have diameters of 5 nm to 100 nm and more preferably have diameters of 20 nm to 35 nm. The cross sections of the framework have diameters of 2 nm to 25 nm and more preferably 3 nm to 7 nm.

The method for producing a silica aerogel according to the second embodiment includes the gelation step of adding the monoalkyltrialkoxysilane to the acidic aqueous solution containing the surfactant and the silicic acid to produce a sol and gelating the sol into a wet gel. The producing method further includes the separation step of immersing the wet gel in the solvent mixture of the first solvent and the second solvent immiscible with the first solvent to move the surfactant contained in the wet gel to the phase of the second solvent while moving the wet gel to the first solvent. The first solvent has an $E_T^N$ value of 0.5 or less while the second solvent has an $E_T^N$ value between those of the first solvent and water. The producing method further includes the drying step of drying the wet gel which has moved to the phase of the first solvent in the separation step at a temperature lower than the critical temperature of the first solvent under a pressure lower than the critical pressure of the first solvent to remove the first solvent from the wet gel.

Similarly to the first embodiment, the producing method of the second embodiment includes a step to remove the surfactant by immersing the wet gel in the solvent mixture of the first solvent as the low polar solvent and the second solvent as the polar solvent, which are immiscible with each other. This can shorten the process of solvent exchange and considerably reduce the usage of solvent. It is therefore possible to lessen the impact on the environment and reduce the producing cost.

Moreover, the producing method of the second embodiment does not need drying under the supercritical conditions, which is required by the conventional producing method. Accordingly, the producing process and the equipment are simplified. Furthermore, the producing method of the second embodiment does not need to use a fluorine solvent as a drying solvent as described in Patent Literature 2, thus reducing the production cost and the impact on the environment.

If the silica aerogel is made from only the monoalkyltrialkoxysilane, which is expensive, the production cost is high. In the second embodiment, a part of the monoalkyltrialkoxysilane as the raw material is replaced with the acidic silicic acid aqueous solution derived from inexpensive water glass, so that the production cost can be reduced.

The producing method of the second embodiment uses the acidic silicic acid aqueous solution and the monoalkyltrialkoxysilane to combine the silicic acid sol with the silicon compound having an alkyl group at the molecular level. In other words, the gel wall surface of the wet gel is coated with the alkyl group derived from the monoalkyltrialkoxysilane. This can reduce contraction of the volume of the wet gel in the drying process, so that the produced silica aerogel has a low bulk density and a small average pore diameter. Moreover, the framework molecules include alkyl groups, so that the silica aerogel has both high rigidity and flexibility. The silica aerogel include pores smaller than the mean free path of air and a small bulk density. Accordingly, similarly to the first embodiment, the silica aerogel is therefore excellent in heat insulation performance and can be preferably used as the heat insulation materials in the architectural field, home appliances, and industrial facilities. In addition to the heat insulation materials, the silica aerogel can be preferably used as catalyst supports and the like.

EXAMPLES

Hereinafter, the embodiments are described in detail using examples but are not limited by the examples.

Example 1

First, 0.50 g of cetyltrimethylammonium chloride (hexadecyltrimethylammonium chloride, hereinafter, abbreviated as CTAC) made by Nacalai Tesque, Inc. as the surfactant was dissolved in 10.00 g. of acetic acid aqueous solution with a concentration of 0.01 mol/L. 3.00 g of urea made by Nacalai Tesque, Inc. was then dissolved, thus preparing the acidic aqueous solution.

Next, 5.0 mL of methyltrimethoxysilane (hereinafter, abbreviated as MTMS) as the silicon compound was added to the acidic aqueous solution. The mixture was then stirred for 30 minutes for hydrolytic reaction of MTMS, thus producing a sol. The methyltrimethoxysilane was KBM-13 (specific gravity: 0.95) made by Shin-Etsu Chemicals Co., Ltd. The produced sol was left to stand at 60° C. in a hermetically sealed container for gelation. The gel was continuously left to stand for 96 hours for aging, thus preparing a gel-like compound.

Next, the gel-like compound was pulverized and immersed in water at 60° C. for 24 hours. Thereafter, the gel-like compound was put into a solvent mixture of 100 mL of heptane and 10 mL of isopropyl alcohol (WA) added to 100 mL of methanol together with a reaction solution and was left to stand at 60° C. Methanol has an $E_T^N$ value of 0.762 while heptane has an $E_T^N$ value of about 0.01. The solution mixture was separated into two phases. The upper phase was a phase of heptane while the lower phase was a mixture phase of methanol and water.

As a result of leaving the gel-like compound to stand for six hours, the gel-like compound rose from the lower phase to the upper phase. The gel-like compound was extracted from the upper phase and was dried at 120° C. for 12 hours under atmospheric pressure. Silica aerogel particles of Example 1 were thus obtained.

As a result of evaluation of the obtained silica aerogel particles, the bulk density was 0.15 g/cm³, the thermal conductivity was 0.012 W/(m·K), and the mean particle diameter was 1000 μm.

Example 2

First, sodium water glass solution was prepared, which had a $SiO_2$ content of 6% by mass and a ratio of $Na_2O/SiO_2$ of 1/3. 1 L of the sodium water glass solution was passed through a column filled with 0.5 L of strongly acidic cation exchange resin, thus obtaining acidic silicic acid sol. In this process, the flown out solution had a pH value of 1.5. Herein, the strongly acidic cation exchange resin is Amberlite (registered trademark) made by Organo Corporation.

Next, 0.50 g of CTAC as the surfactant was dissolved in 10 g of the obtained acidic silicic acid sol. Then, 3.00 g of urea was dissolved in the silicic acid sol mixed with the surfactant for preparation of an acidic aqueous solution.

The prepared acidic aqueous solution was added with 5.0 mL of MTMS of Example 1 as the silicon compound. The mixture was stirred for 30 minutes for hydrolytic reaction of MTMS, thus preparing a sol. The prepared sol was left to stand at 60° C. in a hermetically sealed container for gelation. The obtained gel was continuously left to stand for 96 hours to be aged, thus producing a gel-like compound.

Next, the gel-like compound was pulverized and immersed in water at 60° C. for 24 hours. The gel-like compound was then put into a solvent mixture of 100 mL of heptane and 10 mL of isopropyl alcohol (IPA) added to 100 mL of methanol together with a reaction solution and was left to stand at 60° C. The solution mixture was separated into two phases. The upper phase was a phase of heptane while the lower phase was a mixture phase of methanol and water.

As a result of leaving the gel-like compound to stand for six hours, the gel-like compound rose from the lower phase to the upper phase. The gel-like compound was extracted from the upper phase and was dried at 120° C. for 12 hours under atmospheric pressure. Silica aerogel particles of Example 2 were thus obtained.

As a result of evaluation of the obtained silica aerogel particles, the bulk density was 0.15 g/cm³, the thermal conductivity was 0.012 W/(m·K), and the mean particle diameter was 1000 μm.

In Example 2, the wet gel was extracted using the solvent mixture of methanol, heptane, and IPA. Accordingly, the silica aerogel was obtained without using a large amount of solvent unlike the conventional art. The obtained silica aerogel had a bulk density of not greater than 0.20 g/cm³ and a thermal conductivity of not greater than 0.020 W/(m·K). This reveals that the obtained silica aerogel is lightweight and excellent in heat insulation.

The entire contents of Japanese Patent Application No. 2014-106119 (filed on: 22 May 2014) are incorporated herein by reference.

Hereinabove, the details of the embodiments are described along the examples. However, the embodiments are not limited by the description, and it is obvious for those skilled in the art that various modifications and improvements can be made for the embodiments.

INDUSTRIAL APPLICABILITY

In the method for producing a silica aerogel of the present invention, a wet gel synthesized by a method including a surfactant is immersed in the solvent mixture of the low-polar solvent and the polar solvent immiscible with each other to remove the surfactant. This can shorten the process of solvent exchange and significantly reduce the usage of solvent. It is therefore possible to lessen the impact on the environment and reduce the producing cost.

The invention claimed is:

1. A method for producing a silica aerogel, the method comprising:
   a gelation step of adding a monoalkyltrialkoxysilane to an acidic aqueous solution containing a surfactant to prepare a sol, and then gelating the sol to prepare a wet gel;
   a separation step of immersing the wet gel in a solvent mixture of a first solvent and a second solvent immiscible with the first solvent to move the surfactant contained in the wet gel to a phase of the second solvent while moving the wet gel to a phase of the first solvent, the first solvent having an $E_T^N$ value of 0.5 or less, and the second solvent having an $E_T^N$ value between those of the first solvent and water; and
   a drying step of drying the wet gel having moved to the phase of the first solvent in the separation step at a temperature lower than a critical temperature of the first solvent under a pressure lower than a critical pressure of the first solvent to remove the first solvent from the wet gel.

2. The method for producing a silica aerogel according to claim 1, wherein the acidic aqueous solution further includes a silicic acid.

3. The method for producing a silica aerogel according to claim 1, wherein the first solvent contains at least one selected from the group consisting of heptane, hexane, and hexamethyldisiloxane.

4. The method for producing a silica aerogel according to claim 1, wherein the second solvent contains at least one of methanol and isopropyl alcohol.

5. The method for producing a silica aerogel according to claim 1, wherein the $E_T^N$ value of the second solvent is not less than 0.70 and less than 1.00.

6. The method for producing a silica aerogel according to claim 1, wherein the second solvent contains methanol.

\* \* \* \* \*